May 26, 1970     H. C. HARBERS     3,514,089
RESILIENT ELASTOMERIC BUSHING ASSEMBLY
Filed Feb. 13, 1967
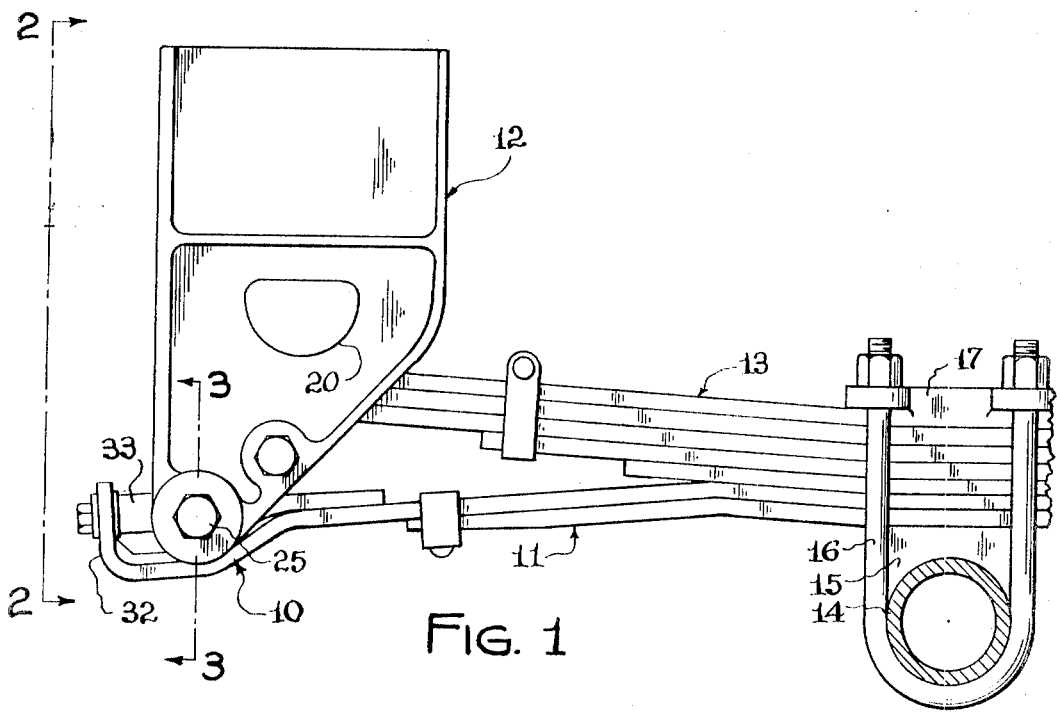
FIG. 1
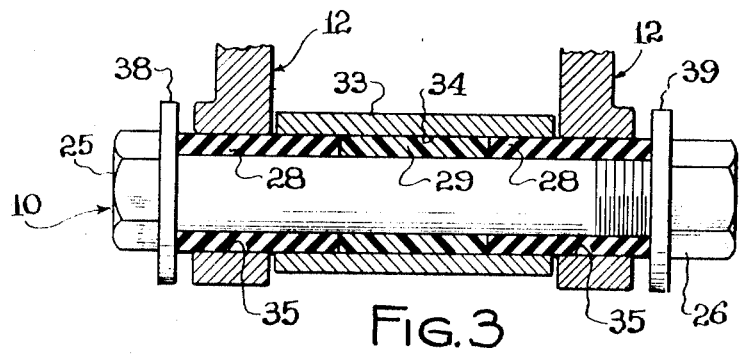
FIG. 2
FIG. 3
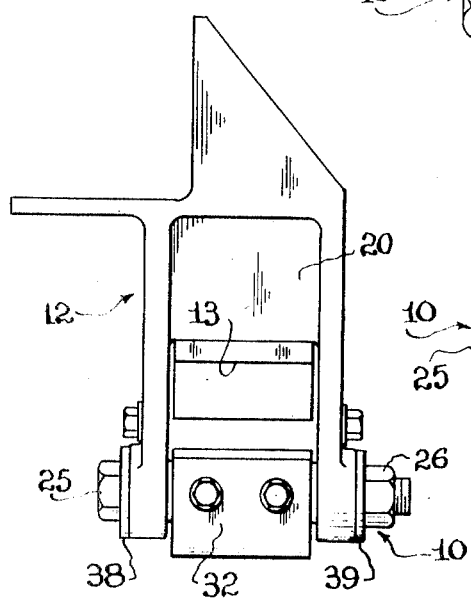
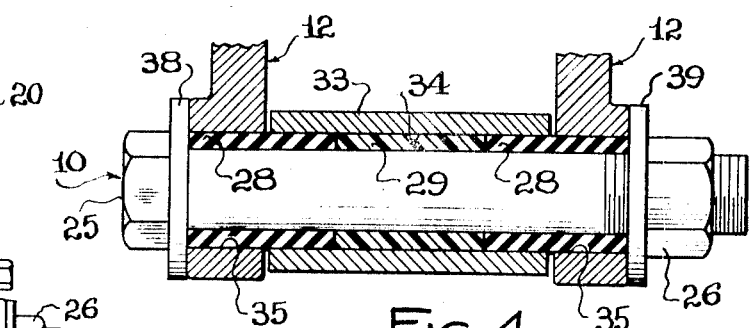
FIG. 4
INVENTOR.
HENRY C. HARBERS
BY
ATTORNEYS

United States Patent Office 3,514,089
Patented May 26, 1970

---

3,514,089
RESILIENT ELASTOMERIC BUSHING ASSEMBLY
Henry C. Harbers, Pasadena, Calif., assignor to Western Unit Corporation, Industry, Calif., a corporation of California
Filed Feb. 13, 1967, Ser. No. 615,688
Int. Cl. F16f 1/30, 7/02, 1/16
U.S. Cl. 267—54         4 Claims

ABSTRACT OF THE DISCLOSURE

A long-life bushing assembly particularly advantageous in coupling a vehicle draft linkage to a chassis frame. The assembly includes relatively short resilient sleeves encircling each end of an assembly bolt coupling the draft linkage to the chassis frame with substantially equal end portions of each sleeve held compressed within the hanger opening and within the bore of the linkage. The central portion of the assembly bolt is encircled by a non-resilient spacer having its ends abutting the adjacent end of a respective one of the resilient sleeves.

---

This invention relates to resilient bushings and more particularly to an improved bushing assembly having numerous applications typically represented by the bushing connection customarily used between a vehicle chassis and the outer end of a radius member for one of the vehicle carriages.

The practice of many years standing in resilient bushings has utilized rubber sleeving material embracing the full length of the connector bolt, the sleeve being of sufficient length to project beyond the opposite ends of the final assembly before tightening. The bolt is then tightened to place the intervening rubber sleeves in compression. However, it has been found in practice that the service life of such bushings is surprisingly short and not in accordance with estimates based on studies of the properties and characteristics of the materials employed. It has now been found that the service life of the same structure modified in relatively minor details provides a vastly superior product with a service life at least 25 times greater. This result is achievable by eliminating approximately the middle third portion of the rubber sleeve previously used and substituting for the eliminated portion a substantially non-compressable spacer member arranged to carry substantially no torque load but solely a compressive load acting axially thereof. The two end sleeves of elastomeric material have assembled lengths substantially equally divided between the bolt support and the intervening radius or load transmitting member.

Accordingly, it is a primary object of the present invention to avoid the foregoing and other shortcomings of the prior resilient bushing assemblies and to provide a product having a greatly extended service life.

Another object of the invention is the provision of a simple inexpensive resilient bushing assembly featuring a spacer sleeve separating two or more resilient sleeve members assembled upon a common means for adjusting the axially-applied compressive pressures on the resilient sleeve members.

Another object of the invention is the provision of a greatly improved bushing assembly for use on vehicle suspension assemblies and particularly between the hanger brackets and the radius members of such assemblies.

These and other more specific objects will appear upon reading the following specification and claims and upon considering in connection therewith the attached drawing to which they relate.

Referring now to the drawing in which a preferred embodiment of the invention is illustrated.

FIG. 1 is a fragmentary side elevational view of a preferred application of the invention bushing assembly used to connect a spring radius member to a vehicle hanger assembly;

FIG. 2 is an end elevational view taken along line 2—2 on FIG. 1; and

FIGURES 3 and 4 are cross-sectional views on an enlarged scale taken along line 3—3 on FIGURE 1, FIGURE 3 showing the bushing assembly before tightening the bolt and FIGURE 4 showing the same parts after tightening the bolt.

Referring initially more particularly to FIGURE 1, there is shown a preferred embodiment of the present invention wherein the bushing assembly, designated generally 10, is shown in a typical operating environment as used to connect the forward end of a spring-type radius assembly 11 to a yoke-like hanger bracket 12. While not shown, it will be understood that bracket 12 is customarily welded or riveted to a vehicle frame and serves as a yoke to connect spring suspension 13 to a carriage axle 14. The means holding the latter parts rigidly assembled includes a spring seat member 15 interposed between radius member 11 and axle 14 by a pair of clamping U-bolts 16 and a pressure plate 17. The latter plate is seated crosswise of the upper side spring 13 and cooperates with the other U-bolt 16 to hold the parts rigidly to axle 14.

As best shown in FIG. 2, hanger bracket 12 includes a rigid cross member 20 against which the left hand end of spring 13 bears in a manner well known to those skilled in this art.

Bushing assembly 10 includes a through bolt 25 provided with a clamping nut 26 at its threaded end. Telescoped over the threaded end of this bolt prior to assembly within the hanger bracket are a pair of identical sleeves 28, 28 of suitable elastomeric material having the requisite properties necessary to withstand the rigorous conditions encountered in service. Desirably, the sleeves are formed of neoprene or a like elastomer immune to attack by oils and greases and capable of withstanding wide range changes in temperature as well as severe shock and vibration loads. Interposed between the adjacent inner ends of sleeves 28, 28 is a spacer sleeve 29 of a material substantially non-elastic as compared to the material of sleeves 28. Spacer 29 also preferably has an outer diameter a few mils less than the relaxed outer diameter of sleeves 28. Either metallic or non-metallic material is suitable for the spacer although highly satisfactory results are obtained using a plastic such as nylon.

The outer or left hand end of radius spring assembly 11 has an upturned end 32 seating a fitting 33. This fitting is provided with a bore 34 having the same diameter as aligned openings 35, 35 through the opposite sides of hanger brackets 12.

The assembly of the described bushing is accomplished by first inserting a washer 38 over the bolt followed by the sleeve 28, the spacer sleeve 29 and the second bushing sleeve 28. This assembly is then inserted through the aligned openings 35 and 34 and second washer 39 and nut 26 are applied. At this time the sleeves 28 will fit snugly within the opposite ends of opening 34 with their outer ends projecting rather substantially beyond the outer ends of hanger openings 35. Before tightening the nut 26 the operator takes careful note that the outer ends of the bushings project substantially equal distances beyond the outer faces of the hanger and that their inner ends abut the adjacent ends of spacer 29. This having been done nut 26 is wrenched thereby placing bushings 28 under increasing axial compression and forcing them to expand against the bolt and against bores 34 and 35. If an excessive length of elastomer is employed the outer end portion will tend to expand into the space between the outer face of the brackets and the adjacent one of washers 38, 39. In some cases, expansion at this point is unavoidable; however, best results are achieved when the bushing length is so selected that substantially all of it can be compressed within the outer ends of openings 35.

To be observed is the fact that substantially equal lengths of each bushing sleeve 28 are embraced within bores 34 and 35. Additionally and importantly, all portions of the bushing sleeve are substantially uniformly compressed or loaded, a fact which has been found to contrast strikingly with the non-uniformity of stress distribution characteristic of prior bushing assemblies. It is theorized but not established by rigid proof that the non-uniformity of compression characterizing former longer type sleeves contributes primarily to their short service life and to other undesirable operating characteristics. The demonstrable fact is that the particular bushing assembly of this invention is not subject to these deficiencies.

While the particular resilient bushing assembly herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A resilient shock-absorbing knuckle assembly having limited freedom of pivotal movement, said knuckle assembly comprising a rigid yoke having aligned cylindrical bores crosswise of the legs thereof, draft member means having a cylindrical bore crosswise thereof of the same diameter as the bores in said yoke, spacer sleeve means located centrally of the length of the bore in said draft member means with its ends spaced inwardly of the adjacent ends of said bore, a pair of cylindrical elastomeric bushing sleeves assembled into said yoke and draft member bores with their inner ends seated in the bore housing said spacer sleeve means and bearing against the adjacent ends thereof and their remote ends projecting beyond the outer ends of said yoke bores before being compressed, and bolt means extending through said spacer means and said elastomeric sleeves tightened against the remote ends of said sleeves and holding said sleeves compressed against the opposite ends of said spacer means with the compression forces in said elastomeric sleeves acting radially and axially and distributed substantially uniformly from end-to-end thereof.

2. A resilient knuckle assembly as defined in claim 1 characterized in that said spacer sleeve means has a loose fit within the bore in said draft member means in the fully assembled condition of said knuckle assembly.

3. A resilient knuckle assembly as defined in claim 1 characterized in that substantially equal lengths of said elastomeric sleeves are located in the bore of said draft member means and in said yoke bores.

4. A resilient knuckle assembly as defined in claim 1 characterized in that said sleeves are of uniform external and internal diameters throughout the lengths thereof.

References Cited

UNITED STATES PATENTS

| | | | |
|---|---|---|---|
| 1,817,438 | 8/1931 | Henry et al. | 267—54 |
| 2,031,954 | 2/1936 | Jandus | 267—54 |
| 1,548,049 | 8/1925 | Lord | 267—54 |
| 2,166,822 | 7/1939 | Parker | 267—30 XR |
| 2,236,686 | 4/1941 | Jackson | 267—30 XR |
| 2,308,967 | 1/1943 | Kuss | 267—54 XR |

FOREIGN PATENTS

| | | |
|---|---|---|
| 160,238 | 12/1954 | Australia. |
| 527,780 | 10/1940 | Great Britain. |

ARTHUR L. LA POINT, Primary Examiner

H. BELTRAN, Assistant Examiner

U.S. Cl. X.R.

267—1, 57.1